United States Patent
Huang et al.

(10) Patent No.: US 9,714,502 B2
(45) Date of Patent: Jul. 25, 2017

(54) SWITCH DEVICE WITH MULTIPLE WATER OUTPUTS

(71) Applicant: Xiamen Runner Industrial Corporation, Xiamen (CN)

(72) Inventors: Huan-Long Huang, Xiamen (CN); Wen-Hua Ye, Xiamen (CN); Zhao-Yi Zhuo, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 15/158,282

(22) Filed: May 18, 2016

(65) Prior Publication Data

US 2016/0340875 A1  Nov. 24, 2016

(30) Foreign Application Priority Data

May 20, 2015 (CN) .......................... 2015 1 0258590

(51) Int. Cl.
| | |
|---|---|
| *E03C 1/04* | (2006.01) |
| *F16K 11/074* | (2006.01) |
| *B05B 1/16* | (2006.01) |
| *B05B 1/18* | (2006.01) |
| *B05B 12/00* | (2006.01) |
| *F16K 31/524* | (2006.01) |
| *E03C 1/02* | (2006.01) |

(52) U.S. Cl.
CPC .......... *E03C 1/0405* (2013.01); *B05B 1/1636* (2013.01); *B05B 1/18* (2013.01); *B05B 12/002* (2013.01); *F16K 11/074* (2013.01); *F16K 31/52475* (2013.01); *E03C 2001/026* (2013.01); *Y10T 137/86501* (2015.04)

(58) Field of Classification Search
CPC ....... E03C 1/0405; B05B 1/1636; B05B 1/18; B05B 12/002; Y10T 137/86501
See application file for complete search history.

(56) References Cited

U.S. PATENT DOCUMENTS

| | | | | |
|---|---|---|---|---|
| 5,862,985 | A * | 1/1999 | Neibrook | B05B 1/1636 239/428.5 |
| 6,626,203 | B1 * | 9/2003 | Schneider | F16K 11/074 137/270 |
| 6,755,204 | B2 * | 6/2004 | Herbert | F16K 11/166 137/1 |
| 8,276,833 | B2 * | 10/2012 | Cheng | E03C 1/0409 239/436 |
| 9,512,602 | B2 * | 12/2016 | Lei | E03C 1/0405 |

(Continued)

*Primary Examiner* — Craig Schneider
*Assistant Examiner* — Kevin Barss
(74) *Attorney, Agent, or Firm* — Chun-Ming Shih

(57) ABSTRACT

A switch device with multiple water outputs includes a switch valve, a rotary rod, an engagement ring, a first rotary plate and a second rotary plate. The rotary rod is mounted through an opening of the switch valve. The engagement ring has an inner toothed ring and an outer toothed ring formed on a bottom end of the rotary rod. The first rotary plate and the second rotary plate respectively engage the inner toothed ring and the outer toothed ring, and the both rotary plates have multiple holes. As water entering the holes with different number and deviation angle of the first and second rotary plate selectively communicate with each other, different water outputs can be provided.

9 Claims, 6 Drawing Sheets

(56) References Cited

U.S. PATENT DOCUMENTS

| | | | |
|---|---|---|---|
| 2012/0111435 A1* | 5/2012 | Antonetti | F16K 11/074 137/625 |
| 2012/0318391 A1* | 12/2012 | Zhou | E03C 1/08 137/625.46 |
| 2013/0068860 A1* | 3/2013 | Tempel | B05B 1/3033 239/428.5 |
| 2016/0310972 A1* | 10/2016 | Lin | B05B 1/18 |
| 2016/0354597 A1* | 12/2016 | Schlaeper | A61M 1/367 |
| 2017/0090491 A1* | 3/2017 | Nobili | F16K 31/086 |
| 2017/0136473 A1* | 5/2017 | Yu | B05B 1/1636 |

\* cited by examiner

SWITCH DEVICE WITH MULTIPLE WATER OUTPUTS

BACKGROUND OF THE INVENTION

Field of the Invention

The present invention relates a to a switch device and, more particularly, to a switch device with multiple water outputs.

Description of the Related Art

Currently, faucets in kitchen adopt a handle to switch a top and down plate to have different water outputs ranging from two to four different water outputs. However, even the maximal four water outputs are still not enough to meet users' expectation in their daily life. Moreover, because of limited space on the down plate of the switch device, the down plate doesn't have water output, through the switch device connected with different water output hole, and have different water outputs.

SUMMARY OF THE INVENTION

In view of the problems and drawbacks of the prior art, the objective of the present invention is to provides a switch device with multiple water outputs featuring a simple structure, easy control and multiple water outputs.

To achieve the foregoing objective, the switch device with multiple water flow type includes a switch valve, a rotary rod, an engagement ring, a first rotary plate and a second rotary plate.

The switch valve has a top portion and a bottom portion. The top portion has an opening, and the bottom portion has a recess and a hole. The recess is formed in a top surface of the bottom portion. The hole is formed through the bottom portion of the switch valve.

The rotary rod has a top end, a bottom end. The top end is mounted through the opening of the switch valve.

The engagement ring has two toothed rings formed on the bottom end of the rotary rod.

The first rotary plate engages one of the two toothed rings, is mounted inside the recess of the switch valve, and has a spindle, a stem and multiple first holes.

The spindle is formed on a top surface of the first rotary plate and is mounted inside the toothed ring engaging the first rotary plate.

The stem is formed on a bottom surface of the first rotary plate and is mounted through the hole of the switch valve.

The multiple first holes are mounted through the first rotary plate.

The second rotary plate engages the other toothed ring, is mounted inside the recess of the switch valve, and has multiple second holes formed through the second rotary plate.

BRIEF DESCRIPTION OF THE DRAWINGS

The detailed description of the drawings particularly refers to the accompanying figures in which.

DETAILED DESCRIPTION OF THE INVENTION

The purpose, construction, features, functions and advantages of the present invention can be appreciated and understood more thoroughly through the following detailed description with reference to the attached drawings.

Figure 1:
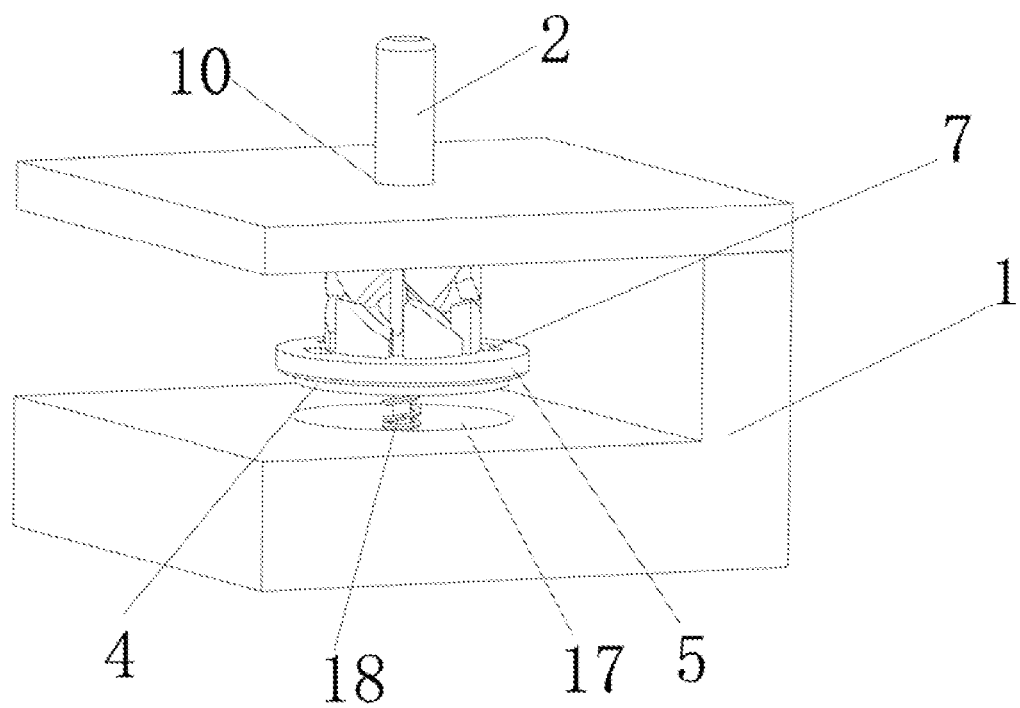
FIG. 1 is a perspective view of a switch device in accordance with the present invention.
Figure 2:
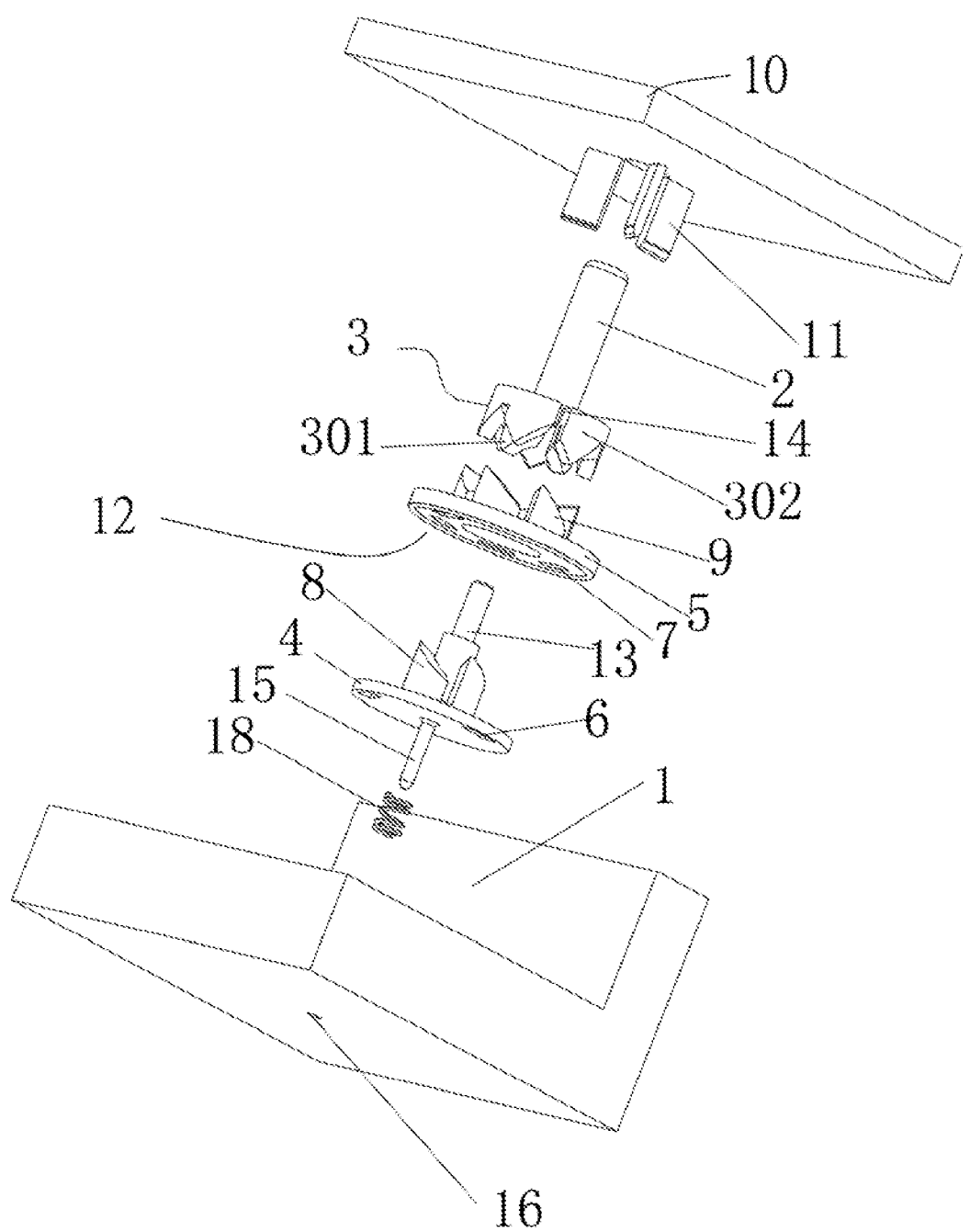
FIG. 2 is an exploded perspective view of the switch device in FIG. 1.

With reference to FIGS. 1 and 2, a switch device with multiple water outputs in accordance with the present invention includes a switch valve 1, a rotary rod 2, an engagement ring 3, a first rotary plate 4 and a second rotary plate 5.

The switch valve 1 has a top portion and a bottom portion. The top portion of the switch valve 1 has an opening 10 and multiple bars 11. The opening 10 is formed through the top portion. The bars 11 are formed on a bottom surface of the top portion of the switch valve 1. The bottom portion of the switch valve 1 has a recess 17 and a hole 16. The recess 17 is formed in a top surface of the bottom portion. The hole 16 centrally formed through the bottom portion of the switch valve 1.

The rotary rod 2 has a top end and a bottom end, and the top end is mounted through the opening 10 of the switch valve 1.

Figure 9:
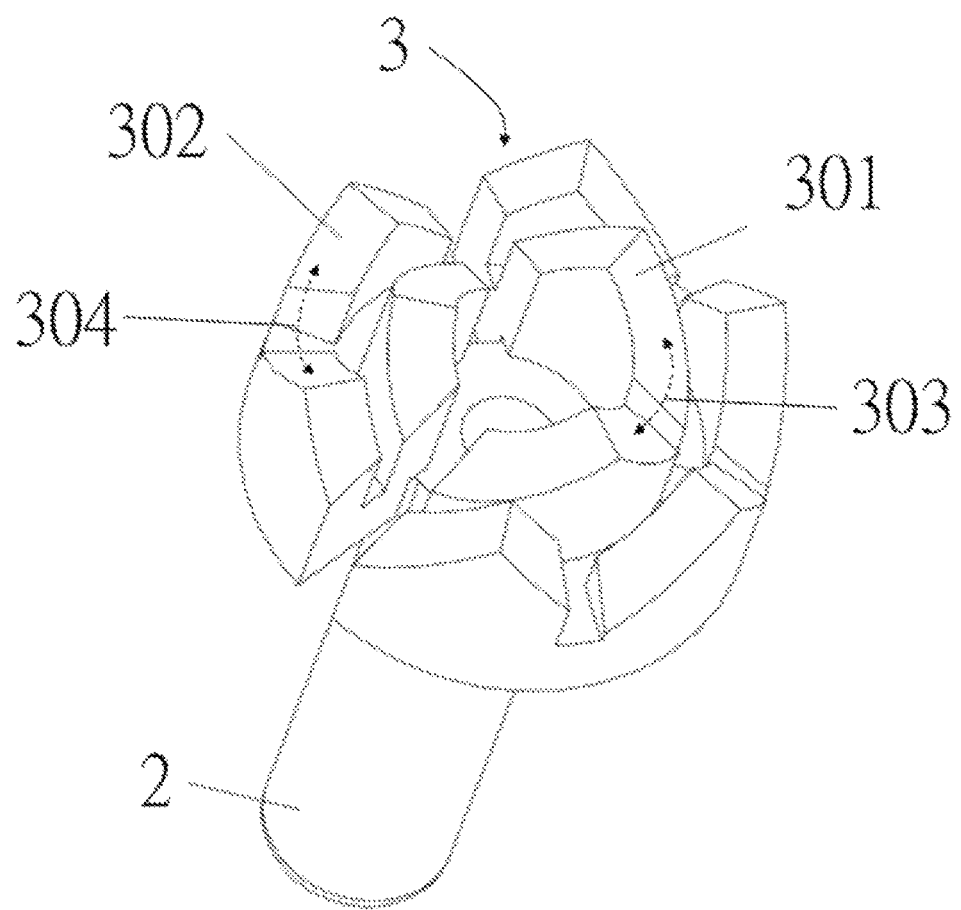
FIG. 9 is a perspective view of the engagement ring of the switch device in FIG. 1.

With reference to FIG. 9, the engagement ring 3 is mounted around a periphery of the bottom end of the rotary rod 2. The engagement ring 3 has an inner toothed ring 301 and an outer toothed ring 302. The outer toothed ring 302 surrounds the inner toothed ring 301. An angle at a circular segment of the engagement ring 3 between each adjacent two of the inner toothed ring 301 is defined as an inner deviation angle 303. An angle at a circular segment of the engagement ring 3 between each adjacent two of the outer toothed ring 302 is defined as an outer deviation angle 304. Multiple channels 14 are formed through the outer toothed ring 302 and the inner toothed ring 301, and the bars 11 of the switch valve 1 are mounted in the respective channels 14 to prevent the inner toothed ring 301 and the outer toothed ring 302 from rotating but to keep the inner toothed ring 301 and the outer toothed ring 302 movable up and down along an axial direction of the switch device, and to get the rotary rod 2 fixed.

Figure 8:
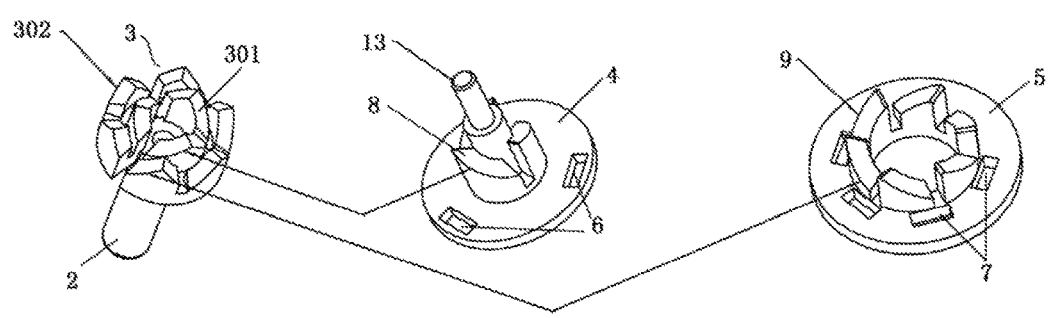
FIG. 8 is an exploded perspective view of an engagement ring, the first rotary plate and the second rotary plate of the switch device in FIG. 1.

With reference to FIG. 8, the first rotary plate 4 has a spindle 13, multiple first teeth 8, multiple first water holes 6 and a stem 15. The spindle 13 is formed on a top surface of the first rotary plate 4. The first teeth 8 are formed on the top surface of the first rotary plate 4, are located on a perimeter of the first rotary plate 4, are spaced apart from each other by a gap, and are arranged around the spindle 13. The first holes 6 are formed through the first rotary plate 4 and surround the first teeth 8. Each first hole 6 defines an operation position. An angle at a circular segment of the first rotary plate 4 between each adjacent two of the first teeth 8 is same as the inner deviation angle 303 of the inner toothed ring 301, and the alternate angle at the circumference and alternate interior angle of two neighbor of the first holes 6 are same. The stem 15 is formed on a bottom surface of the first rotary plate 4, and is mounted through the hole 16 of the switch valve 1 with a spring 18 mounted around the stem 15.

With reference to FIG. 8, the second rotary plate 5 has multiple second teeth 9, a central hole 12 and multiple second holes 7. The second teeth 9 are formed on a top surface of the second rotary plate 5. An angle at a circular segment of the second rotary plate between each adjacent two of the second teeth 9 is same as the outer deviation angle 304 of the outer toothed ring 302. The central hole 12 is centrally formed through the second rotary plate 5, and the second holes 7 are formed through the second rotary plate 5 and are located around the central hole 12. Each second hole 7 defines another operation position. The second teeth 9 are located between the center hole 12 and the second holes 7.

The spindle 13 and the first teeth 8 are mounted through the central hole 12 for the first rotary plate 4 to be connected with the second rotary plate 5. The angle at the circumference of two neighbor of the second teeth 9 are alternate interior angle, and the alternate angle at the circumference and alternate interior angle of two neighbor of the second holes 7 are same. The first rotary plate 4 and the second rotary plate 5 are mounted into the recess 17. Further, the quantity of teeth in the inner toothed ring 301 is the same as that of the first teeth 8, and the inner toothed ring 301 engages the first teeth 8. The quantity of teeth in the outer toothed ring 302 is the same as that of the second teeth 9, and the outer toothed ring 302 engages the second teeth 9. The quantity of teeth in each of the outer toothed ring 302 and the second teeth 9 doubles that of each of the inner toothed ring 301 and the first teeth 8.

Embodiment 1

Figure 3:
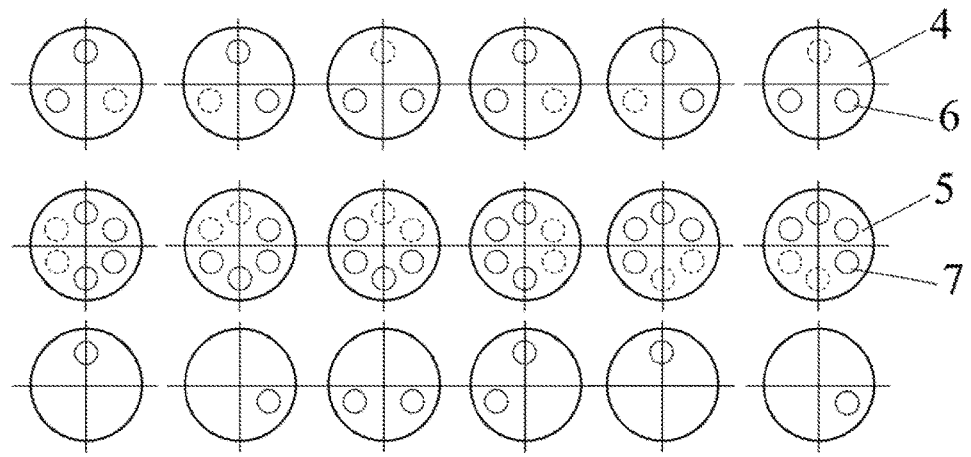
FIGS. 3-7 are operational top views of a first rotary plate and a second rotary plate switched to provide multiple water outputs.

With reference to FIG. 3, the first teeth 8 of the first rotary plate 1 engage the inner toothed ring 301. The first rotary plate 4 has three first holes 6, and two of the first holes 6 located next to each other, which are selected to be open and correspond to two operation positions, are spaced apart from each other by the inner deviation angle, which is 120°. The second teeth 9 of the second rotary plate 2 engage the outer toothed ring 302. The second rotary plate 5 has six second holes 7, and four of the second holes 7 located next to one another or at every other second hole 7, which are selected to be open and correspond to four operation positions, are spaced apart from one another by the outer deviation angle, which is 60°, or double of the outer deviation angle, which is 120°.

Embodiment 2

Figure 4:
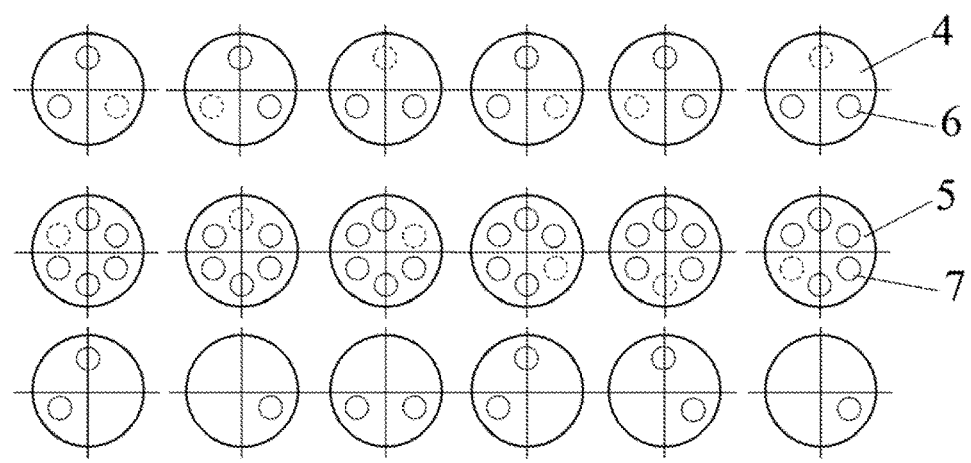
Figure 5:
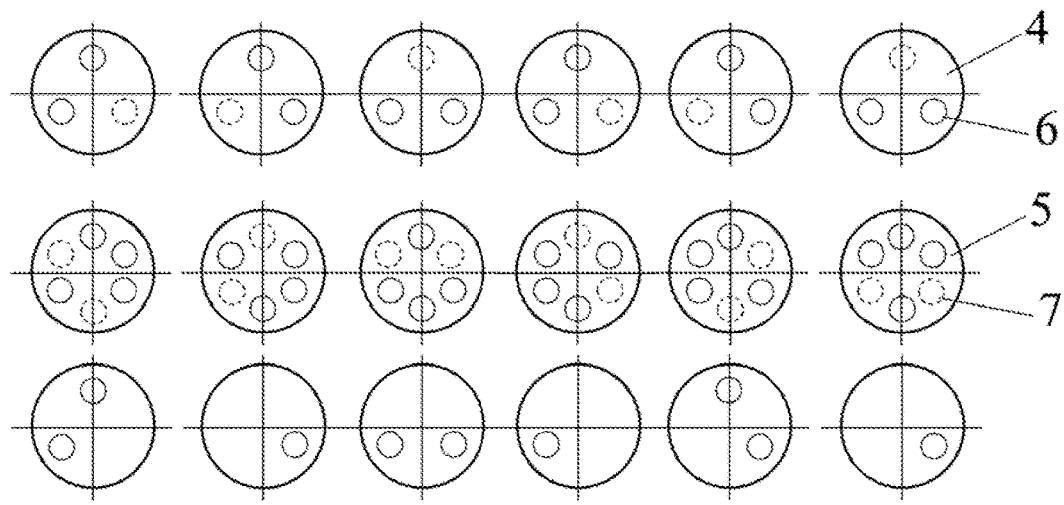

With reference to FIGS. 4 and 5, the first teeth 8 of the first rotary plate 1 engage the inner toothed ring 301. The first rotary plate 4 has three first holes 6, and two of the first holes 6 next to each other that are selected to be open and correspond to two operation positions are spaced apart from each other by the inner deviation angle, which is 120°. The second teeth 9 of the second rotary plate 2 engage the outer toothed ring 302. The second rotary plate 5 has six second holes 7, and five of the second holes 7 next to each other, which are selected to be open and correspond to five operation positions, are spaced apart from one another by the outer deviation angle, which 60°.

Embodiment 3

Figure 6:
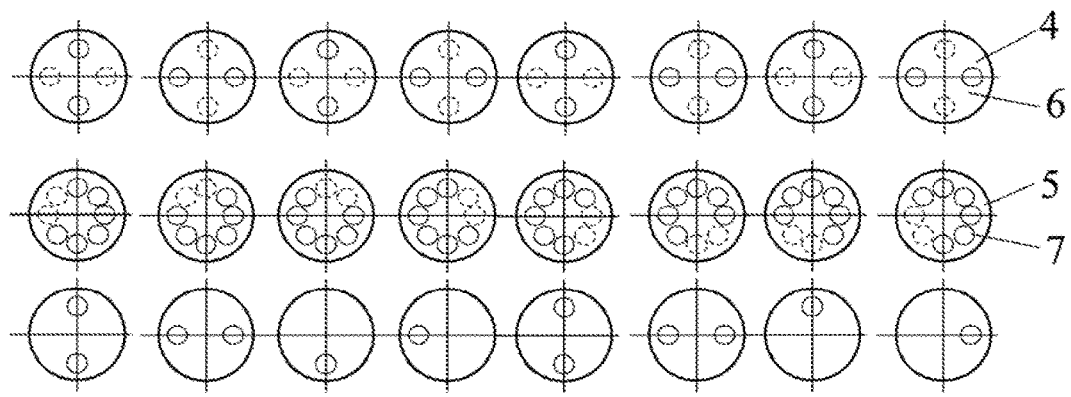

With reference to FIG. 6, the first teeth 8 of the first rotary plate 1 engage the inner toothed ring 301. The first rotary plate 4 has four first holes 6, and two of the first holes 6 located at every other first hole 6, which are selected to be open and correspond to two operation positions, are spaced apart from each other by double of the inner deviation angle, which is 180°. The second teeth 9 of the second rotary plate 2 engage the outer toothed ring 302. The second rotary plate 5 has eight second holes 7, and six of the second holes 7 located next to each other, which are selected to be open and correspond to six operation positions, are spaced apart from one another by the outer deviation angle, which is 45°.

Embodiment 4

Figure 7:
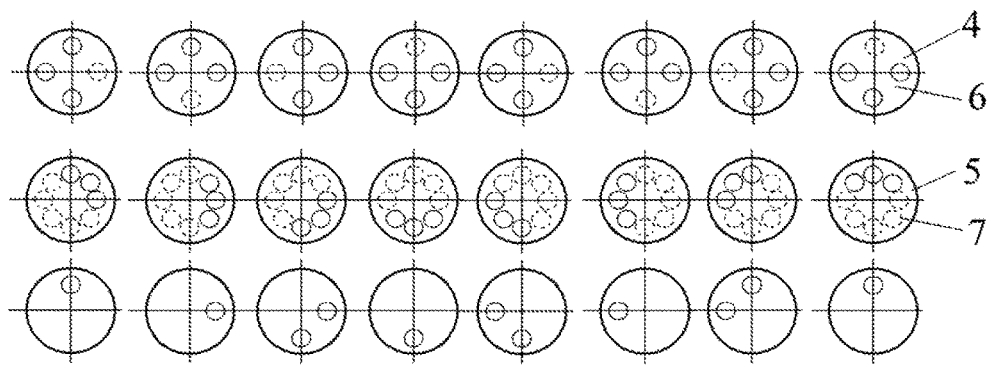

With reference to FIG. 7, the first teeth 8 of the first rotary plate 1 engage the inner toothed ring 301. The first rotary plate 4 has four first holes 6, and three of the first holes 6 located next to each other, which are selected to be open and correspond to three operation positions, are spaced apart from each other by double of the inner deviation angle, which is 90°. The second teeth 9 of the second rotary plate 2 engage the outer toothed ring 302. The second rotary plate 5 has eight second holes 7, and three of the second holes 7 located next to one another, which are selected to be open and correspond to three operation positions, are spaced apart from one another by the outer deviation angle, which 45°.

During operation, the rotary rod 2 is pushed to rotate toward the first rotary plate 4 and the second rotary plate 5 to a next operation position. When one of the first holes 6 of the first rotary plate 4 that is open communicates with one of the second holes 7 of the second rotary plate 5 that is open, water then flows out sequentially through the second hole 7 and the first hole 6.

With reference to FIGS. 3 to 7, the number of the first holes 6 of the first rotary plate 4 may be three or four, and the inner deviation angle may be 180°, 120°, or 90°. The number of the second holes 7 of the second rotary plate 5 may be six, or eight, and the outer deviation angle may be 120°, 60°, or 45°. Because the number and the inner deviation angle of the first holes 6 and the number and the outer deviation angle of the second holes 7 may be different, embodiment 1 has 4 or 5 kinds of water outputs, embodiment 2 has 4 kinds of water outputs, embodiment 3 has 6 kinds of water outputs, and embodiment 4 has 7 kinds of water outputs.

What is claimed is:

1. A switch device with multiple water outputs, comprising:
   a switch valve having a top portion and a bottom portion, wherein the top portion has an opening, the bottom portion has a recess formed in a top surface of the bottom portion, and a hole is formed through the bottom portion of the switch valve;
   a rotary rod having:
      a top end mounted through the opening of the switch valve; and
      a bottom end;
   an engagement ring having two toothed rings formed on the bottom end of the rotary rod;
   a first rotary plate engaging one of the two toothed rings, mounted inside the recess of the switch valve, and having:
      a spindle formed on a top surface of the first rotary plate and mounted inside the toothed ring engaging the first rotary plate;
      a stem formed on a bottom surface of the first rotary plate and mounted through the hole of the switch valve; and
   multiple first holes mounted through the first rotary plate; and a second rotary plate engaging the other toothed ring, mounted inside the recess of the switch valve, and having multiple second holes formed through the second rotary plate.

2. The switch device as claimed in claim 1, wherein the two toothed rings have an inner toothed ring formed on the first rotary plate and an outer toothed ring formed on the second rotary plate, the first rotary plate has multiple first teeth formed on a top surface thereof, the second rotary plate has multiple second teeth formed on a top surface thereof, a quantity of teeth in the inner toothed ring is the same as that of the first teeth, a quantity of the outer toothed ring is the same as that of the second teeth, an angle at a circular segment of the first rotary plate between each adjacent two of the first teeth is defined as an inner deviation angle, and an angle at a circular segment of the second rotary plate between each adjacent two of the second teeth is defined as an inner deviation angle.

3. The switch device as claimed in claim 2, wherein at least two of the multiple first holes of the first rotary plate selected to be open and to correspond to at least two operation positions are spaced apart from each other by the inner deviation angle, and at least two of the multiple second holes of the second rotary plate selected to be open and to correspond to at least two operation positions are spaced apart from each other by the outer deviation angle.

4. The switch device as claimed in claim 3, wherein a quantity of the second teeth is double of that of the first teeth.

5. The switch device as claimed in claim 1, wherein the top portion of the switch valve has an opening formed through the top portion for the top end of the rotary rod to be mounted through the opening and three bars formed on a bottom surface of the top portion of the switch valve, three channels are formed through the inner toothed ring and the outer toothed ring, and the three bars of the switch valve are mounted in the respective channels, and the stem of the first rotary plate is mounted through the hole of the switch valve with a spring mounted around the stem.

6. The switch device as claimed in claim 1, wherein the first rotary plate has three first holes, and two of the first holes located next to each other, which are selected to be open and correspond to two operation positions, are spaced apart from each other by the inner deviation angle, which is 120°, the second rotary plate has six second holes, and four of the second holes located next to one another or at every other second hole, which are selected to be open and correspond to four operation positions, are spaced apart from one another by the outer deviation angle, which is 60°, and the selected two first holes selectively communicate with the selected four second holes to provide four kinds of water outputs.

7. The switch device as claimed in claim 1, wherein the first rotary plate has three first holes, and two of the first holes located next to each other, which are selected to be open and correspond to two operation positions, are spaced apart from each other by the inner deviation angle, which is 120°, the second rotary plate has six second holes, and five of the second holes located next to one another, which are selected to be open and correspond to five operation positions, are spaced apart from one another by the outer deviation angle, which is 60°.

8. The switch device as claimed in claim 1, wherein the first rotary plate has four first holes, and two of the first holes located at every other first hole, which are selected to be open and correspond to two operation positions, are spaced apart from each other by double of the inner deviation angle, which is 180°, the second rotary plate has eight second holes, and six of the second holes located next to each other, which are selected to be open and correspond to six operation positions, are spaced apart from one another by the outer deviation angle, which is 45°.

9. The switch device as claimed in claim 1, wherein, the first rotary plate has four first holes, and three of the first holes located next to each other, which are selected to be open and correspond to three operation positions, are spaced apart from each other by double of the inner deviation angle, which is 90°, the second rotary plate has eight second holes, and three of the second holes located next to one another, which are selected to be open and correspond to three operation positions, are spaced apart from one another by the outer deviation angle, which 45°.

* * * * *